(12) United States Patent
Anim-Mensah et al.

(10) Patent No.: US 10,342,406 B2
(45) Date of Patent: Jul. 9, 2019

(54) WAREWASHER IDLING SYSTEM AND METHOD

(71) Applicant: ILLINOIS TOOL WORKS INC., Glenview, IL (US)

(72) Inventors: Alexander R. Anim-Mensah, Centerville, OH (US); Mary E. Paulus, Sidney, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 170 days.

(21) Appl. No.: 15/298,421

(22) Filed: Oct. 20, 2016

(65) Prior Publication Data

US 2017/0112349 A1 Apr. 27, 2017

Related U.S. Application Data

(60) Provisional application No. 62/244,421, filed on Oct. 21, 2015.

(51) Int. Cl.
*A47L 15/42* (2006.01)
*A47L 15/00* (2006.01)
*A47L 15/24* (2006.01)

(52) U.S. Cl.
CPC ....... *A47L 15/4219* (2013.01); *A47L 15/0047* (2013.01); *A47L 15/241* (2013.01); *A47L 2401/12* (2013.01); *A47L 2401/18* (2013.01); *A47L 2501/03* (2013.01); *A47L 2501/05* (2013.01); *A47L 2501/06* (2013.01); *Y02B 40/42* (2013.01)

(58) Field of Classification Search
None
See application file for complete search history.

(56) References Cited

U.S. PATENT DOCUMENTS

| | | | |
|---|---|---|---|
| 4,069,425 | A | 1/1978 | Cushing |
| 4,147,558 | A | 4/1979 | Fraula et al. |
| 4,147,559 | A | 4/1979 | Fraula et al. |
| 4,209,343 | A | 6/1980 | Lane et al. |
| RE30,537 | E | 1/1981 | Fraula et al. |
| RE30,478 | E | 3/1981 | Fraula et al. |
| 4,256,136 | A | 3/1981 | Crawford |
| 4,355,217 | A | 10/1982 | Cushing |

(Continued)

FOREIGN PATENT DOCUMENTS

| | | |
|---|---|---|
| DE | 102005008987 | 6/2006 |
| EP | 1256308 | 11/2002 |

OTHER PUBLICATIONS

PCT, International Search Report and Written Opinion, International Application No. PCT/US2016/057868; dated Dec. 12, 2016, 12 pages.

*Primary Examiner* — Rita P Adhlakha
(74) *Attorney, Agent, or Firm* — Thompson Hine LLP

(57) ABSTRACT

A warewash machine for washing wares includes a chamber for receiving wares, the chamber having at least one spray zone. A spray system is provided in the spray zone for spraying liquid onto wares for cleaning. A tank captures sprayed liquid that falls within the spray zone. The tank includes a primary recirculation path for delivering liquid from the tank to the spray system, and a secondary recirculation path for delivering water out of the tank and back into the tank, without spraying within the spray zone, in order promote mixing within the tank.

17 Claims, 3 Drawing Sheets

(56) References Cited

U.S. PATENT DOCUMENTS

| | | | |
|---|---|---|---|
| 4,468,600 | A | 8/1984 | Barthel et al. |
| 4,521,722 | A | 6/1985 | Barthel et al. |
| 4,561,904 | A | 12/1985 | Eberhardt, Jr. |
| 4,756,321 | A | 7/1988 | Livingston et al. |
| 5,264,043 | A | 11/1993 | Milocco |
| 5,904,163 | A | 5/1999 | Inoue et al. |
| 6,083,892 | A | 7/2000 | Severns et al. |
| 6,840,553 | B2 | 1/2005 | Dirnberger et al. |
| 7,104,269 | B2 | 9/2006 | McKee |
| 7,195,023 | B2 | 3/2007 | McKee et al. |
| 7,332,041 | B2 | 2/2008 | McKee et al. |
| 7,497,222 | B2 | 3/2009 | Edwards et al. |
| 7,935,195 | B2 * | 5/2011 | Gaus ................ A47L 15/24 134/103.1 |
| 8,028,818 | B2 | 10/2011 | Kupetz et al. |
| 8,157,924 | B2 | 4/2012 | Warner et al. |
| 8,323,419 | B2 | 12/2012 | Bastigkeit et al. |
| 8,603,255 | B2 | 12/2013 | Classen et al. |
| 8,663,395 | B2 | 3/2014 | Warner et al. |
| 8,810,423 | B2 | 8/2014 | Kaczmarek et al. |
| 8,852,351 | B2 | 10/2014 | Tuller |
| 8,882,346 | B2 | 11/2014 | Bombardieri et al. |
| 8,932,412 | B2 | 1/2015 | Ferragut, II et al. |
| 9,034,109 | B2 | 5/2015 | Tuller |
| 9,204,778 | B2 | 12/2015 | Jerg et al. |
| 9,226,642 | B1 | 1/2016 | Becknell et al. |
| 9,445,707 | B2 | 9/2016 | Hexem |
| 2006/0236556 | A1 * | 10/2006 | Ferguson ........... A47L 15/0034 34/73 |

\* cited by examiner

WAREWASHER IDLING SYSTEM AND METHOD

TECHNICAL FIELD

This application relates generally to warewashers such as those used in commercial applications such as cafeterias and restaurants and, more particularly, to an idling system for such warewashers.

BACKGROUND

Commercial warewashers commonly include a housing area which defines washing and rinsing zones for dishes, pots pans and other wares. In conveyor-type machines wares are moved through multiple different spray zones within the housing for cleaning (e.g., pre-wash, wash, post-wash (aka power rinse) and rinse zones). One or more of the zones include a tank in which liquid to be sprayed on wares is heated in order to achieve desired cleaning. Maintaining the water at the desired temperature is important for machine operation. Due to water movement within the tank, the temperature within the tank can be maintained relatively uniform when a spray recirculation pump is operating for spraying wares within the zone. However, when the machine is idling and/or the pump is not otherwise being used for spraying, the lack of water movement results in uneven water heating.

Current warewash machines, especially flight type machines, use the major spray recirculation pumps to periodically stir and evenly distributes the heat in the tank(s) as well as warm the chamber(s)/zone(s) to position machine ready for a wash without dropping machine temperature to unacceptable levels. This approach results in substantial energy loss from the use of high numbers of high wattage pump(s) which generate steam to warm the chamber(s). This leads to energy loss through the exhaust as well as to the chamber/zone by cooling down quickly.

It would be desirable to provide a warewasher idling system and method that reduces energy consumption while effectively maintaining desired water temperatures in the machine tanks.

SUMMARY

In one aspect, a warewash machine includes a chamber for receiving wares, the chamber having at least one spray zone. Both a primary recirculation system for delivering liquid from a tank to a spray system, and a secondary recirculation system for stirring or mixing liquid within the tank without passage of the liquid through the spray system are provided. The secondary recirculation system may be operated during machine idling as needed to maintain desired tank temperatures, while flow through the primary recirculation system is maintained off.

In another aspect, a warewash machine includes a chamber for receiving wares, the chamber having at least one spray zone, and a a spray system in the spray zone for spraying liquid onto wares for cleaning. A tank captures sprayed liquid that falls within the spray zone. The tank includes a primary recirculation path for delivering liquid from the tank to the spray system, and a secondary recirculation path for delivering water out of the tank and back into the tank, without spraying within the spray zone, in order promote mixing within the tank.

In a further aspect, a warewash machine includes a chamber for receiving wares to be cleaned, the chamber having at least one spray zone and a liquid collection tank. A primary recirculation system delivers liquid from the collection tank to a spray system for spraying liquid in the spray zone. A secondary recirculation system is provided for mixing liquid within the tank without passage of the liquid through the spray system.

The details of one or more embodiments are set forth in the accompanying drawings and the description below. Other features, objects, and advantages will be apparent from the description and drawings, and from the claims.

DETAILED DESCRIPTION

Figure 1:
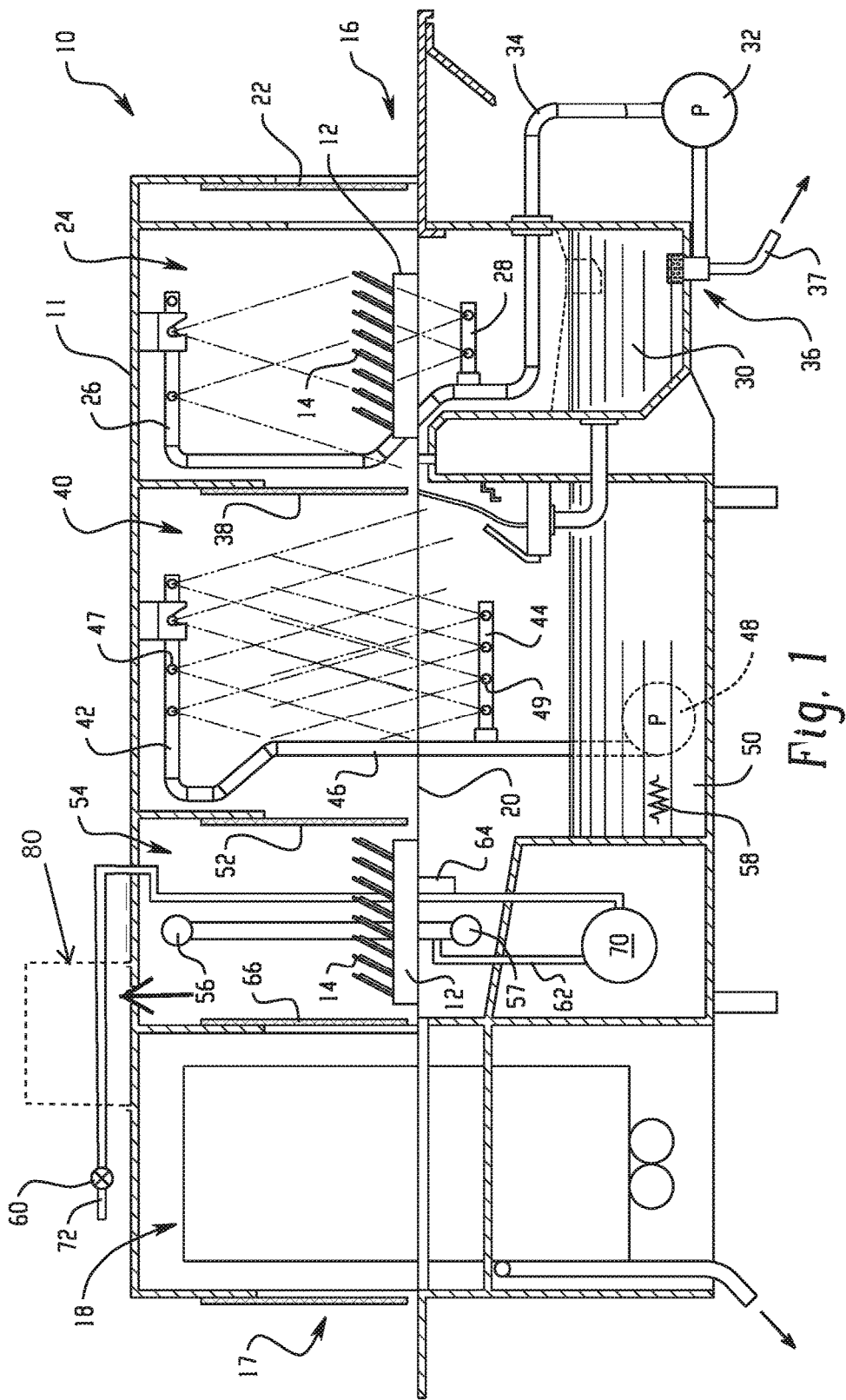
FIG. 1 is a schematic side elevation of one embodiment of a warewasher.

Referring to FIG. 1, an exemplary conveyor-type warewash machine, generally designated 10, is shown. Warewash machine 10 includes a housing 11 that can receive racks 12 of soiled wares 14 from an input side 16. The wares are moved through tunnel-like chambers from the input side toward a blower dryer unit 18 at an opposite exit end 17 of the warewash system by a suitable conveyor mechanism 20. Either continuously or intermittently moving conveyor mechanisms or combinations thereof may be used, depending, for example, on the style, model and size of the warewash system 10. Flight-type conveyors in which racks are not used are also possible. In the illustrated example, the racks 12 of soiled wares 14 enter the warewash system 10 through a flexible curtain 22 into a pre-wash chamber or zone 24 where sprays of liquid from upper and lower pre-wash manifolds 26 and 28 above and below the racks, respectively, function to flush heavier soil from the wares. The liquid for this purpose comes from a tank 30 and is delivered to the manifolds via a pump 32 and supply conduit 34. A drain structure 36 provides a single location where liquid is pumped from the tank 30 using the pump 32. Via the same drain structure, liquid can also be drained from the tank and out of the machine via drain path 37, for example, for a tank cleaning operation.

The racks proceed to a next curtain 38 into a main wash chamber or zone 40, where the wares are subject to sprays of cleansing wash liquid (e.g., typically water with detergent) from upper and lower wash manifolds 42 and 44 with spray nozzles 47 and 49, respectively, these sprays being supplied through a supply conduit 46 by a pump 48, which draws from a main tank 50. A heater 58, such as an electrical immersion heater provided with suitable thermostatic controls (not shown), maintains the temperature of the cleansing liquid in the tank 50 at a suitable level. Not shown, but which may be included, is a device for adding a cleansing detergent to the liquid in tank 50. During normal operation, pumps 32 and 48 are continuously driven, usually by separate motors, once the warewash system 10 is started for a period of time.

The warewash system 10 may optionally include a power rinse (also known as post-wash) chamber or zone (not shown) that is substantially identical to main wash chamber 40. In such an instance, racks of wares proceed from the wash chamber 40 into the power rinse chamber, within which heated rinse water is sprayed onto the wares from upper and lower manifolds.

The racks 12 of wares 14 exit the main wash chamber 40 through a curtain 52 into a final rinse chamber or zone 54. The final rinse chamber 54 is provided with upper and lower spray heads 56, 57 that are supplied with a flow of fresh hot water via pipe 62 running from a hot water booster 70 under the control of a solenoid valve 60 (or alternatively any other suitable valve capable of automatic control). A rack detector 64 may be actuated when a rack 12 of wares 14 is positioned in the final rinse chamber 54 and through suitable electrical controls (e.g., the controller mentioned below), the detector causes actuation of the solenoid valve 60 to open and admit the hot rinse water to the spray heads 56, 57. The water then drains from the wares and is directed into the tank 50 by gravity flow. The rinsed rack 12 of wares 14 then exits the final rinse chamber 54 through curtain 66, moving into dryer unit 18, before exiting the outlet end 17 of the machine.

An exhaust system 80 for hot moist air may be provided. A cold water input 72 line may run through a waste heat recovery unit (not shown) to recover heat from the exhaust air. Other heat recovery components may also be employed.

Figure 2:
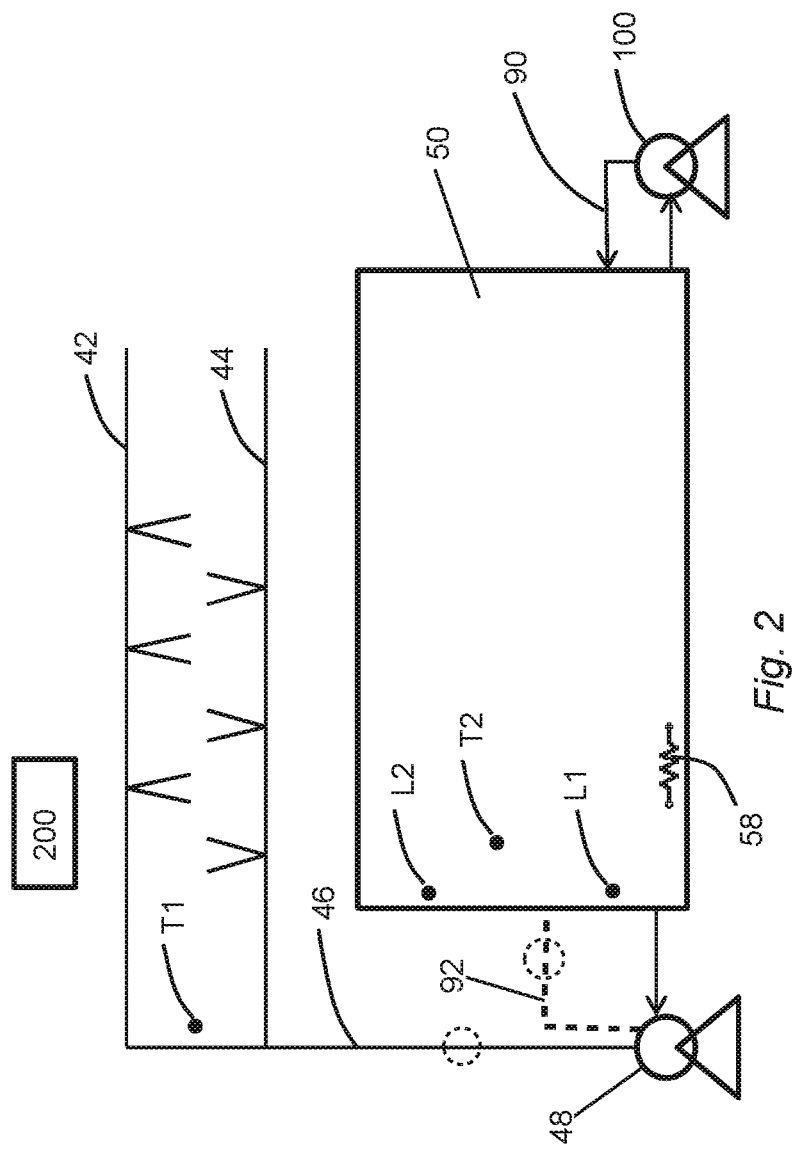
FIG. 2 is a schematic depiction of an exemplary secondary recirculation system for a wash zone.

Referring now to FIG. 2, an exemplary schematic of a wash tank 50 with a small size, low wattage secondary recirculation pump 100 and recirculation path 90, in addition to the larger size, high wattage major spray recirculation pump 48 is shown. Various temperature sensors T1 and T2 (e.g., thermocouples) are also provided, along with tank level sensors L1 and L2 (e.g., float switches or electrical impedance sensors). Although machine tank 50 is referenced, it is recognized that other tanks of a machine could include similar secondary recirculation arrangements.

In normal practice, the heating element 58 switches ON when a lower temperature set point of liquid in the tank 50 is reached (as indicated by temperature sensor T1) and switches OFF when an upper temperature set point is reached (as indicated by temperature sensor T2). In addition, the heating element 58 only switches ON if the liquid is above a set lower level (as indicated by level sensor L1) and remains OFF when the liquid is below the set lower level (as indicated by level sensor L1).

Operation of the secondary recirculation pump 100 may be tied to the heating element controls. Control of the secondary recirculation pump 100 may be according to the lower and upper temperature set points in the tank, as well as the low level setting to protect the pump.

In this regard, the various temperatures corresponding to the lower and upper tank set temperature points, chamber temperature (as indicated by temperature sensor T1) and the tank fluid temperature (per sensor T2) may be used to control the secondary recirculation pump 100. The lower and upper tank set points temperatures which control the heating element 58 may simultaneously control the secondary recirculation pump 100. In normal operation the heating element 58 turns ON when the tank liquid temperature falls to lower temperature set point and switches OFF when the liquid temperature rises to the upper temperature set point. At the lower temperature set point the secondary recirculation pump 100 may turn ON simultaneous with the heating element 58 to ensure uniform mixing of the tank liquid until the upper temperature set point is reached, at which point both the heating element 58 and secondary recirculation pump 100 switch OFF simultaneously, consistent with satisfying Equation (1) below:

$$\text{Tank Fluid Temperature (per } T2\text{)}-\text{Chamber Temperature (per } T1\text{)} > Ta(F) \quad (1)$$

Ta (F) may be a predetermined value. Equation (1) is a simple relation to show the use of temperature to control the secondary recirculation pump 100. However, Equation (1) could represent other relationships.

At any point in the idling process Equation (1) can activate both the secondary recirculation pump 100 and the heating element 58 to position the machine ready for washing. Also, Equation (1) can activate the secondary recirculation pump 100 without activating the heating source 58 until the tank liquid temperature drops to the lower set point and/or the chamber temperature activates the heating element 58. Notably, in such idling operations the major spray pump 48 need not be operated at all.

As shown in FIG. 2, a controller 200 may be provided for the above process a process as well as other machine functions. As used herein, the term controller is intended to broadly encompass any circuit (e.g., solid state, application specific integrated circuit (ASIC), an electronic circuit, a combinational logic circuit, a field programmable gate array (FPGA)), processor (e.g., shared, dedicated, or group—including hardware or software that executes code) or other component, or a combination of some or all of the above, that carries out the control functions of the machine or the control functions of any component thereof. The controller may include variable adjustment functionality that enables, for example, the upper and lower temperature set points to be varied and/or Equation (1) to be modified (e.g., via an operator/user interface associated with the controller 200 or via a restricted service/maintenance personnel interface).

Figure 3:
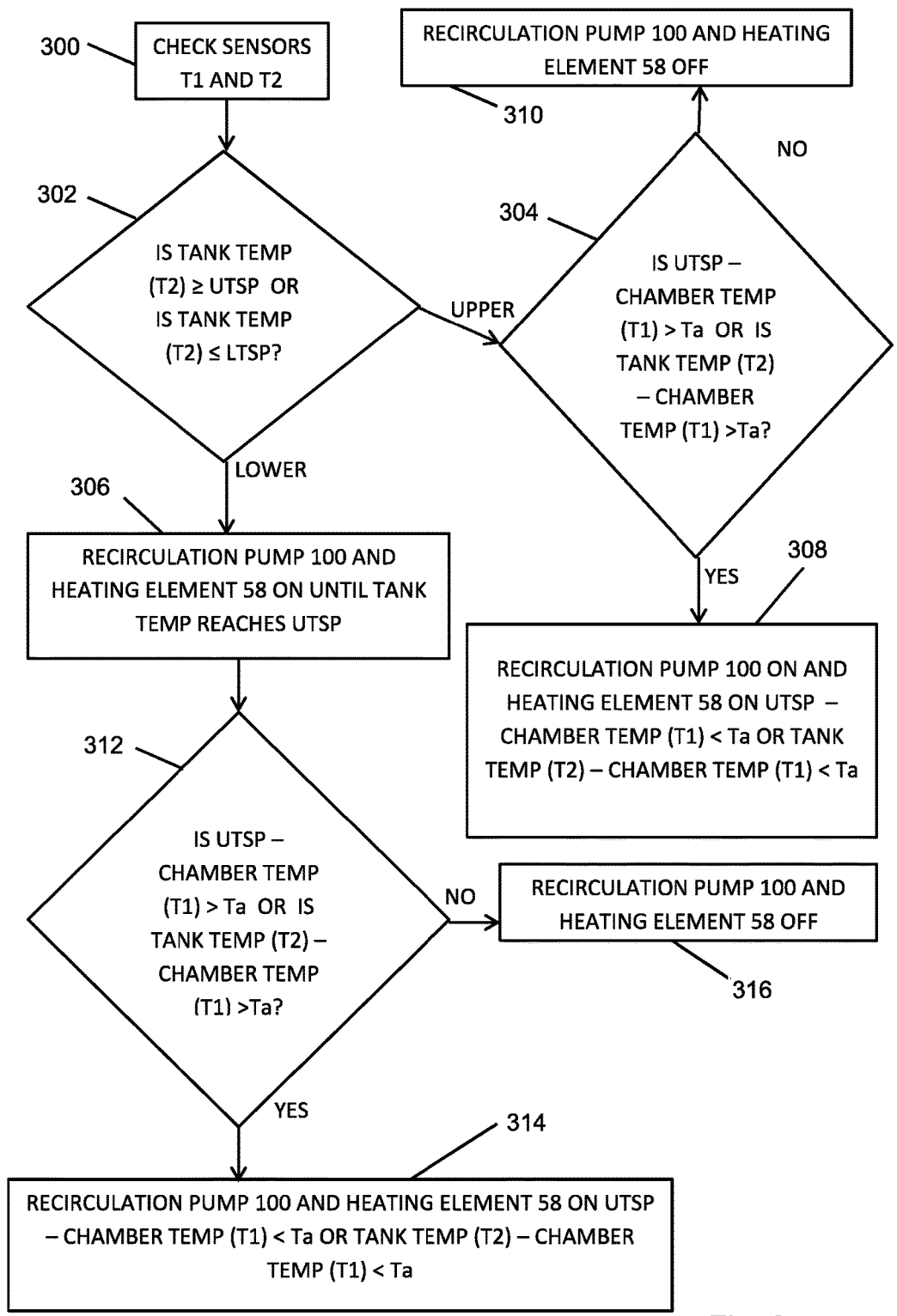
FIG. 3 is a flow chart of an exemplary idling operating sequence.

FIG. 3 shows an exemplary process algorithm based on Equation (1) and the tank temperature set points for activating the secondary recirculation pump 100 and heating element 58. The chamber air temperature sensor T1 and tank temperature sensor T2 are checked at 300. At 302, if the tank temperature is at the upper temperature set point (e.g., UTSP stored in memory of the controller), then processing moves to 304 and if the tank temperature is at the lower temperature set point (e.g., LTSP stored in memory of the controller) then processing moves to 306. At 304, if the difference between the upper temperature set point and the chamber temperature is greater than specified temperature Ta or if the difference between the tank temperature and the chamber temperature is greater than specified temperature Ta, either condition being indicative of a lower than desired heat level in the chamber air, then processing moves to 308, otherwise processing moves to 310.

At 308, both the secondary recirculation pump 100 and heating element 58 are ON until either the difference between the upper temperature set point and the chamber temperature is less than specified temperature Ta or the difference between the tank temperature and the chamber temperature is less than specified temperature Ta (at which point the pump and heating element are turned OFF). This operations increases the chamber air temperature as is desired to add heat to wares in the chamber. At 310, the pump 100 and the heating element 58 are OFF (because the chamber air temperature is sufficiently high).

At 306, the recirculation pump 100 and heating element 58 are both ON until the tank temperature reaches the upper temperature set point, at which point processing moves to 312. At 312, if the difference between the upper temperature set point and the chamber temperature is greater than specified temperature Ta or if the difference between the tank temperature and the chamber temperature is greater than specified temperature Ta, then processing moves to 314, otherwise processing moves to 316.

At 314, the recirculation pump 100 and heating element 58 are ON until either the difference between the upper temperature set point and the chamber temperature is less than specified temperature Ta or the difference between the tank temperature and the chamber temperature is less than specified temperature Ta (at which point the pump and heating element are turned OFF). At 316, the pump and heating element are both turned OFF.

The use of a small size low wattage secondary recirculation pump(s) to accomplish water mixing and heat/temperature distribution during idling reduces energy consumption while enabling maintaining of tank(s) temperature. The secondary pump could also be used to prep the machine from idle mode for operation.

It is to be clearly understood that the above description is intended by way of illustration and example only and is not intended to be taken by way of limitation, and that changes and modifications are possible. Accordingly, other embodiments are contemplated and modifications and changes could be made without departing from the scope of this application.

For example, each tank could include multiple secondary recirculation pumps and/or associated baffles within the tank for more effective stirring/mixing. Moreover, while a secondary recirculation pump 100 is primarily shown and described in FIG. 2, it is recognized that the primary pump 48 could alternatively be provided with dual flow paths (e.g., in addition to path 46, a secondary recirculation system path 92 directly back to the tank 50 per FIG. 2). The pump could have alternative outputs for each path and/or valves (shown as dotted line circles in FIG. 2) along the paths 46 and 92 could be used to control the flow from the pump 48 to the desired location. In such an arrangement the secondary pump 100 could be eliminated and the primary pump 48 operated for recirculation during idling by controlling the flow to go directly back to the tank 50 and not through the spray system.

What is claimed is:

1. A warewash machine for washing wares, comprising:
    a chamber for receiving the wares, the chamber having at least one spray zone;
    a spray system in the spray zone for spraying liquid onto the wares for cleaning;
    a tank for capturing sprayed liquid that falls within the spray zone, the tank including a primary recirculation path for delivering liquid from the tank to the spray system, and a secondary recirculation path for delivering water out of the tank and back into the tank, without spraying within the spray zone, in order to promote mixing within the tank,
    a pump system for controlling flow along both the primary recirculation path and the secondary recirculation path; and
    a controller operatively connected for controlling operation of the pump system, where the controller is configured such that, during a machine idling operation, the pump system is selectively operated to produce flow along the secondary recirculation path for mixing of water within the tank, and flow along the primary recirculation path is stopped.

2. The warewash machine of claim 1 wherein the pump system includes a primary pump along the primary recirculation path and a separate, secondary pump along the secondary recirculation path.

3. The warewash machine of claim 2, further comprising: the controller operatively connected for controlling operation of the primary pump and the secondary pump, wherein the controller is configured such that, during the machine idling operation, the secondary pump is selectively operated to produce flow along the secondary recirculation path for mixing of water within the tank and the primary pump is maintained OFF.

4. The warewash machine of claim 3, further comprising:
    a heating element for heating liquid within the tank;
    wherein the controller is configured such that, during the machine idling operation, the heating element and the secondary pump are both turned ON and OFF simultaneously.

5. The warewash machine of claim 3, further comprising:
    a heating element for heating liquid within the tank;
    at least one temperature sensor for indicating temperature of liquid in the tank;
    wherein the controller is configured such that, during the machine idling operation, the heating element and the secondary pump are both controlled at least in part based upon sensed temperature of liquid in the tank.

6. The warewash machine of claim 5 wherein the controller is configured such that, during the machine idling operation, the heating element and the secondary pump are both controlled at least in part based upon whether the sensed temperature of liquid in the tank is at a lower temperature set point and/or at an upper temperature set point.

7. The warewash machine of claim 6 wherein the lower temperature set point is predefined and stored in memory and the upper temperature set point is predefined and stored in the memory.

8. The warewash machine of claim 5, further comprising:
    at least one spray zone temperature sensor for indicating temperature of air within the spray zone, wherein the controller is configured such that, during the machine idling operation, the heating element and the secondary pump are both controlled at least in part based upon sensed air temperature in the spray zone.

9. The warewash machine of claim 1 wherein the pump system includes a common pump that is located to selectively drive flow along either the primary recirculation path or the secondary recirculation path, the controller operatively connected for controlling operation of the common pump, the controller configured such that, during a machine idling operation, the common pump is selectively operated to flow liquid along the secondary recirculation path for mixing of water within the tank.

10. The warewash machined of claim 9 further comprising:
    a temperature sensor for indicating temperature of liquid in the tank or a temperature sensor for indicating air temperature within spray zone;
    wherein the controller is configured such that, during the machine idling operation, the common pump is selectively operated to flow liquid along the secondary recirculation path based upon at least one of sensed temperature of liquid in the tank or sensed spray zone air temperature.

11. A warewash machine comprising:
    a chamber for receiving wares to be cleaned, the chamber having at least one spray zone and a liquid collection tank;
    a primary recirculation system for delivering liquid from the collection tank to a spray system for spraying liquid in the spray zone;
    a secondary recirculation system for delivering liquid out of the collection tank along a path and then back into the collection tank for mixing liquid within the tank without passage of the liquid through the spray system or any other spray nozzles; and a controller configured to operate the secondary recirculation system during machine idling as needed to maintain tank liquid temperature, while flow through the primary recirculation system is maintained OFF.

12. The warewash system of claim 11 wherein the primary recirculation system includes a primary pump, the secondary recirculation system includes a secondary pump, and the secondary pump is of smaller size and wattage than the primary pump.

13. The warewash machine of claim 11 further comprising:
   a temperature sensor for indicating temperature of liquid in the tank or a temperature sensor for indicating spray zone air temperature;
   the controller configured to selectively operate the secondary recirculation system during machine idling based at least in part upon at least one of sensed tank liquid temperature or sensed spray zone air temperature.

14. The warewash machine of claim 13 wherein the controller is configured to selectively operate the secondary recirculation system during machine idling based at least in part upon whether the sensed tank liquid temperature is at a lower temperature set point and/or at an upper temperature set point.

15. The warewash machine of claim 14 wherein the controller is configured to selectively operate the secondary recirculation system during the machine idling based at least in part upon at least one of: (a) whether a difference between the upper temperature set point and the sensed spray zone air temperature exceeds a predefined limit or (b) whether a difference between the sensed tank liquid temperature and the sensed spray zone air temperature exceeds a predefined limit.

16. The warewash machine of claim 14 wherein the lower temperature set point is stored in the memory and adjustable via a user interface of the machine and the upper temperature set point is stored in the memory and adjustable via the user interface of the machine.

17. The warewash machine of claim 11 wherein a common pump is located to selectively drive flow along either the primary recirculation path or the secondary recirculation path.

* * * * *